US008626064B2

(12) United States Patent
Moore

(10) Patent No.: US 8,626,064 B2
(45) Date of Patent: Jan. 7, 2014

(54) COMMUNICATION DEVICE

(76) Inventor: Ben Moore, Nashua, NH (US)

(*) Notice: Subject to any disclaimer, the term of this patent is extended or adjusted under 35 U.S.C. 154(b) by 1053 days.

(21) Appl. No.: 12/313,204

(22) Filed: Nov. 19, 2008

(65) Prior Publication Data
US 2010/0124884 A1 May 20, 2010

(51) Int. Cl.
H04B 7/00 (2006.01)

(52) U.S. Cl.
USPC ....... 455/41.2; 455/572; 455/575.1; 455/557; 455/575.7; 455/90.3; 340/407.1

(58) Field of Classification Search
USPC ......... 455/567, 557, 556.1, 575.1, 41.2, 41.3; 340/311.1, 407.1, 825.19
See application file for complete search history.

(56) References Cited

U.S. PATENT DOCUMENTS

| | | | | |
|---|---|---|---|---|
| 5,960,367 A | * | 9/1999 | Kita | 455/567 |
| 6,218,958 B1 | * | 4/2001 | Eichstaedt et al. | 340/7.6 |
| 6,424,251 B1 | * | 7/2002 | Byrne | 340/7.58 |
| 6,897,787 B2 | | 5/2005 | Colorado | |
| 6,954,659 B2 | * | 10/2005 | Tushinsky et al. | 455/567 |
| 7,038,398 B1 | | 5/2006 | Lys | |
| 7,203,524 B2 | * | 4/2007 | Tushinsky et al. | 455/567 |
| 7,295,608 B2 | | 11/2007 | Reynolds | |
| 7,433,649 B2 | * | 10/2008 | Toulis et al. | 455/41.2 |
| 7,627,351 B2 | * | 12/2009 | Rich et al. | 455/567 |
| 7,945,292 B2 | * | 5/2011 | Sweeney et al. | 455/567 |
| 8,081,964 B1 | * | 12/2011 | Enzmann et al. | 455/420 |
| 2002/0115478 A1 | * | 8/2002 | Fujisawa et al. | 455/567 |
| 2002/0186122 A1 | * | 12/2002 | Gehlot | 340/7.58 |
| 2005/0181827 A1 | * | 8/2005 | Nieminen-Sundell et al. | 455/557 |
| 2006/0273895 A1 | | 12/2006 | Kollin | |
| 2007/0142042 A1 | | 6/2007 | Thoresson | |
| 2009/0088207 A1 | * | 4/2009 | Sweeney et al. | 455/557 |

* cited by examiner

Primary Examiner — April G Gonzales
(74) Attorney, Agent, or Firm — Hayes Soloway P.C.

(57) ABSTRACT

An interactive communication device, wherein the device is in communication with a second remotely located device, preferably through the use of high-speed wireless technology such as Bluetooth™, and wherein the instant invention is capable of sending and/or receiving a plurality of signals to and from the second remotely located device.

20 Claims, 4 Drawing Sheets

COMMUNICATION DEVICE

BACKGROUND OF THE INVENTION

1. Field of the Invention

The present invention relates generally to the communications industry and, more particularly, to mobile wireless communications.

2. Description of the Related Art

The ability to efficiently communicate between remotely located devices is a significant need that has emerged exponentially with the advent of networked communications, such as the Internet. Many technologies have developed to facilitate the communication between remotely located devices such as two-way communication, cellular technologies and Bluetooth® wireless technology.

Bluetooth® wireless technology is set to revolutionize personal connectivity by providing freedom from wired connections. Bluetooth® is a specification for a small form-factor, low-cost radio solution providing links between mobile computers, mobile phones and other portable and handheld devices.

Bluetooth® wireless technology is an international, open standard for allowing intelligent devices to communicate with each other through wireless, short-range communications. This technology allows any sort of Bluetooth® compliant device—from computers and cell phones to keyboards and headphones—to make its own connections, without wires, cables or any direct action from a user. Bluetooth® is currently incorporated into numerous commercial products including laptops, PDAs, cell phones, and printers. However, there appears to be a need in the field to incorporate Bluetooth® wireless technology into jewelry.

If people could communicate through their jewelry, they would have an advanced manner in which to further convey their love and devotion to each other. Not only does the jewelry have symbolic significance, it could also be considered a tangible method of conveying an impalpable feeling. Such a system where people could communicate through their jewelry would allow couples, family members, and the like to feel more personally connected to each other while physically located distances apart.

The instant invention relates to interactive communication device, wherein the device is in communication with a second remotely located device, preferably through the use of high-speed wireless technology such as Bluetooth™.

In summary, investigation of these disclosed devices illustrates that presently, there is no single device known in the art or combination thereof that meets the requirements of an interactive communication device.

SUMMARY OF THE INVENTION

The instant invention, as illustrated herein, is clearly not anticipated, rendered obvious, or even present in any of the prior art mechanisms, either alone or in any combination thereof.

The primary object of the instant invention is to provide an interactive communication device that allows for communication with a second remotely located device.

Another object of the instant invention is to provide a device that transmits a signal to a second remotely located device, wherein the signal causes the second device to illuminate, vibrate or make audible tones.

Another object of the instant invention is to provide a means for emotional communication between two individuals who are separated geographically.

Another object of the instant invention is to provide a device, wherein the housing resembles an ornamental piece of jewelry to be worn by a user.

There has thus been outlined, rather broadly, the more important features of the communication device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty, which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION OF THE PREFERRED EMBODIMENTS

Figure 1:
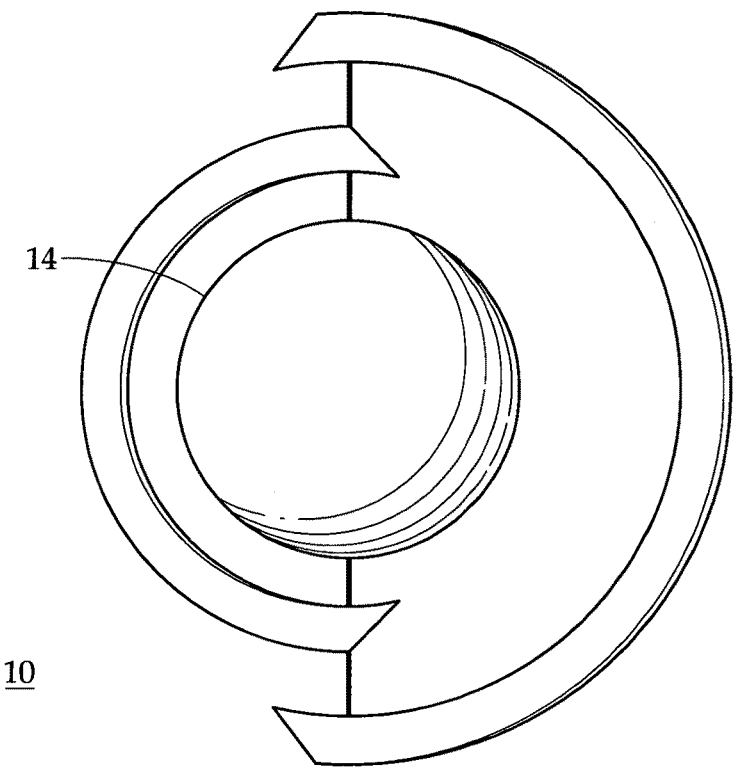
FIG. 1 is a perspective view of the instant invention, wherein a housing encloses an integrated circuitry for communication with a second remotely located device.
Figure 2:
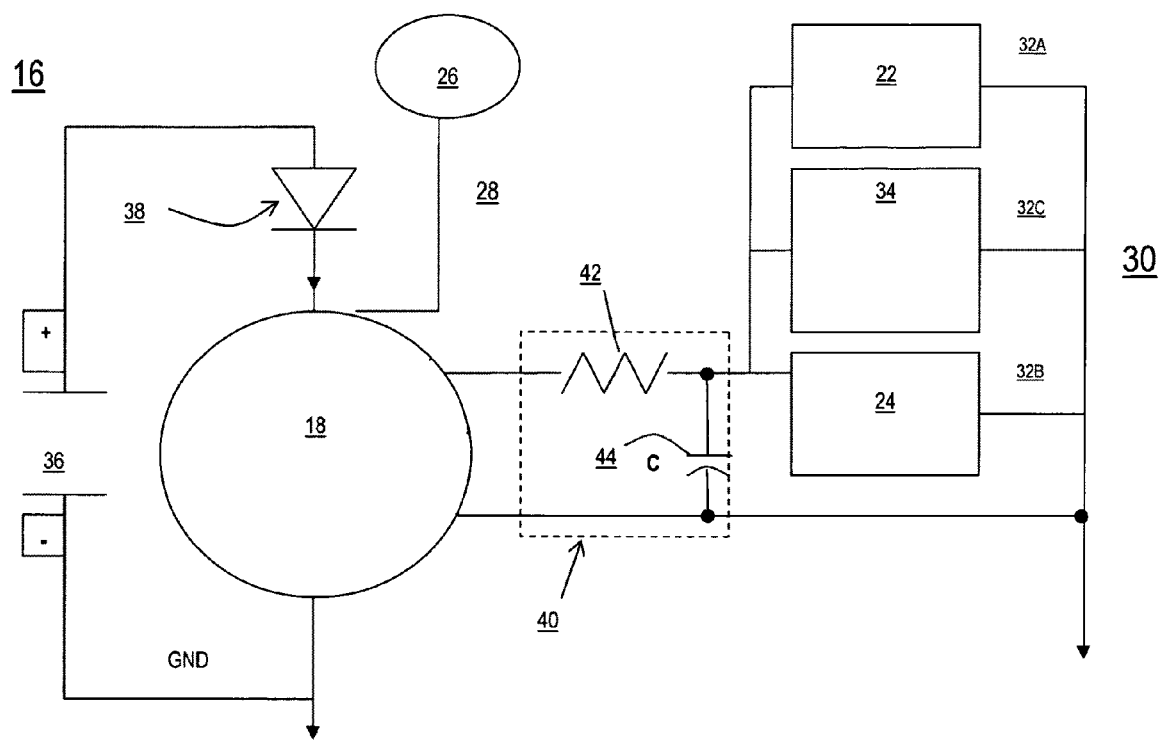
FIG. 2 is a perspective view of an exemplary circuit according to an aspect of the present invention.

FIG. 1 illustrates an interactive communication device 10, wherein the device 10 is in communication with a second remotely located device 12 (see FIG. 6), preferably through the use of high-speed wireless technology such as Bluetooth™, wherein the instant invention 10 is capable of sending and/or receiving a plurality of signals to and from the second remotely located device 12. The communication device 10 comprises a housing member 14, wherein the housing member 14 is preferably in the form of an ornamental piece of jewelry, including, but not limited to a watch, pendant or bracelet (see FIGS. 4 & 5). In addition, as shown in FIG. 2, the housing member 14 contains an integrated circuit 16, wherein the circuit 16 includes a chip 18 embedded in the circuit 16, preferably a Bluetooth™/ISM 2.4 Ghz IC T7024 chip as known in the art that utilizes high-speed wireless technology. Furthermore, the housing 14 includes a plurality of light emitting diodes 22 (LED's), a speaker 24, and an antenna 26, all securably mounted to the external portion of the housing 14 and in communication with the circuit 16 contained within the housing 14.

The instant invention preferably is operable as a personal communication device to allow two individuals the ability to convey mutual feelings through the use of the instant invention 10 in a subtle, real-time communication link. In use, an individual activates the instant invention 10 by preferably touching the device 10 to send a signal to the second device 12, wherein the instant invention 10 will communicate the wireless transmission, preferably through the Bluetooth™ chip incorporated into the device 10, to an individual's wireless carrier network, through any device with Bluetooth™ capabilities and the ability to communicate on a wireless carrier's network, including but not limited to a cellular phone. Once a signal is transmitted over the individual's wireless carrier network, the signal will be received on the wireless carrier network of the individual operating the second remotely located device 12. Finally, the signal will be transmitted to second remotely located device 12, preferably through the use of Bluetooth™ technology, wherein the signal will activate the desired user-programmed response in the second device 12. These include illumination, vibration, and emission of sound, in any configurable combination. This way, when the second device 12 is activated, the second user is notified in real time that the first user is thinking about him or her.

FIG. 2 illustrates the integrated circuit 16 comprising the chip 18 for wireless communication, wherein the chip 18 further includes a first output 28 for connection to the antenna 26. In addition, the chip 18 comprises a plurality of outputs 30, wherein a first output 32A is in communication with the LED's 22 for activation, a second output 32B for communication and transfer of an electronic signal to the speaker 24, and a third output 32C connected to a DC motor 34, wherein the motor 34 preferably includes an off center counterweight that oscillates to produce a vibration, when a signal is received by the antenna 26. A power source 36, such as a battery is attached to the power terminals of the chip 18; in alternate embodiments a diode 38 is placed in the circuit 16 between the power source 36 and the chip 18 to prevent unintentional supply of power having the wrong polarity.

Additionally, the circuit 16 may be vulnerable to generating false alerts from static interference picked up by the antenna 26. Therefore, to prevent false starts, a filter 40 is preferably placed across the terminals of the LED's 22, DC motor 34 and speaker 24. In the preferred embodiment, the filter 40 is configured to absorb brief pulses of energy to the LED's 22, DC motor 34 and/or speaker 24, thereby preventing the device 10 from illuminating in response to interference picked up by the antenna 26. When a more sustained RF signal, perhaps from a mobile communication product that the device 10 is paired with, is picked up by the antenna, the filter 40 passes the resulting energy pulse from the chip 18, causing the LED's 22 to illuminate, the DC motor 34 to vibrate and the speaker 24 to emit an audible sound.

In order for an individual user to configure the filter 40, a resistor 42 should be selected based on the current and voltage required to illuminate the LED's 22, DC motor 34 and speaker 24 in comparison to the current and voltage supplied by the chip 18. It may be advantageous to select a resistor 42 having as much resistance as possible, without noticeably impeding illumination of the LED's 22, functions of the DC motor 34 and/or the audible tones from the speaker 24. For example, a resistor value in the range of about one hundred Ω may be suitable for many applications. Furthermore, a capacitor 44 should be selected based on the value of the resistor 42 and the desired filtering frequency. It may be advantageous to select a value for the capacitor 44 that is as small as possible, while still effectively filtering out pulses having a frequency less than the desired filtering threshold. One of ordinary skill may select suitable values for resistor 42 and capacitor 44, based on the factors described above.

Figure 3:
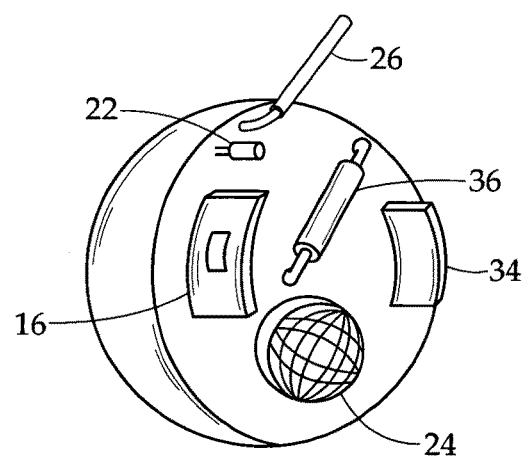
FIG. 3 is a cross-sectional view of the housing of the instant invention, displaying the multiple components of the device.

FIG. 3 illustrates a cross-sectional view of the device 10, and displaying the interior components of the housing 14. As seen from the figure, and described below, the housing 14 contains the LED's 22, the integrated circuit 16 and chip 18, along with the speaker 24, DC motor 34 and power source 36.

Figure 4:
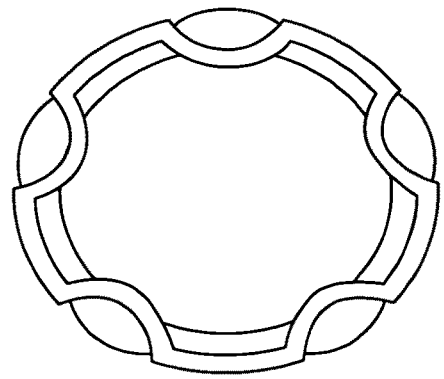
FIG. 4 is a perspective view of an exemplary fashion accessory designed as a pendant according to an aspect of the present invention.
Figure 5:
FIG. 5 is a perspective view of an exemplary fashion accessory designed as a bracelet according to an aspect of the present invention.
Figure 5:
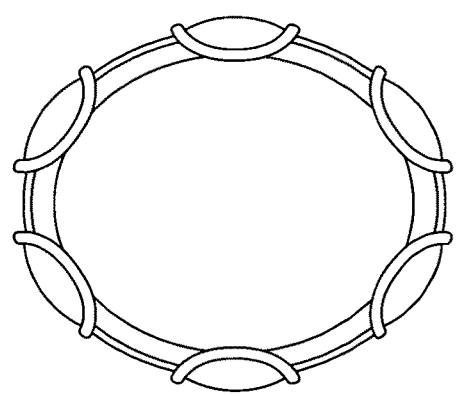

FIGS. 4 and 5 illustrate alternate embodiments of the instant invention, wherein the housing 14 of the device 10 is designed as a watch or a bracelet, thereby allowing individuals to utilize the design of their choice.

Figure 6:
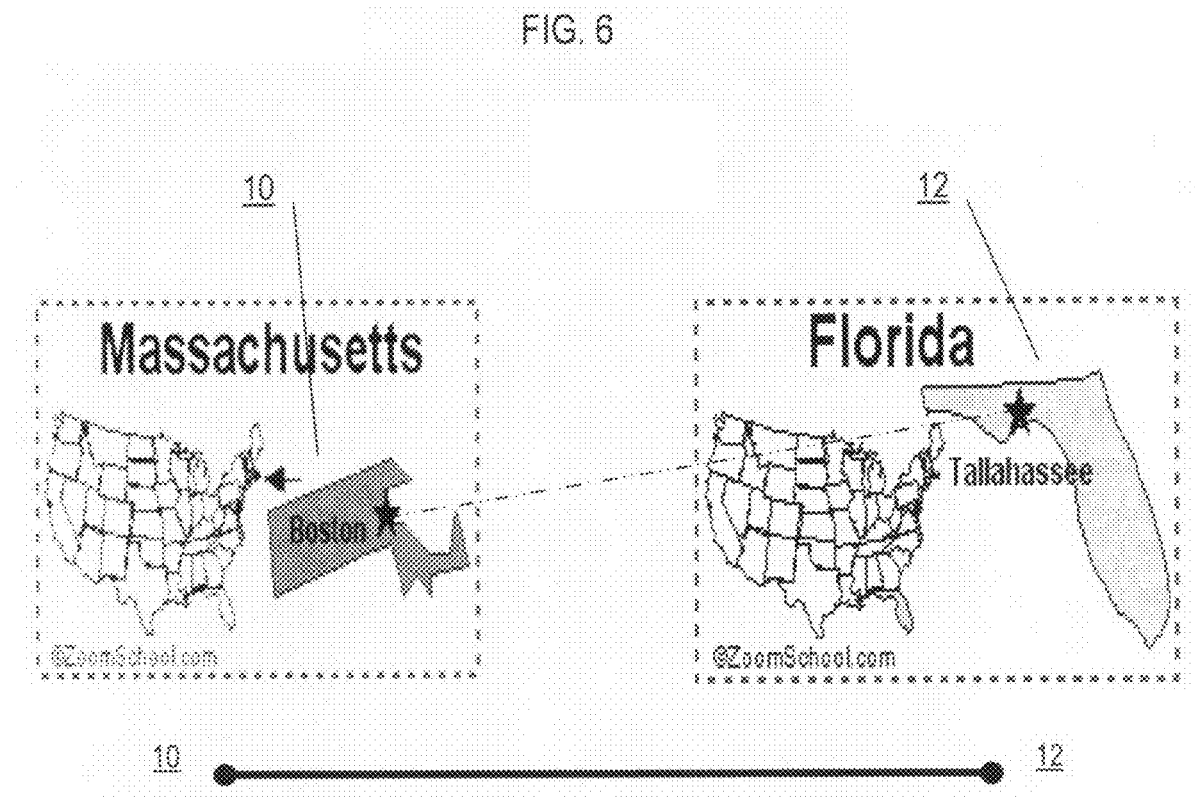
FIG. 6 is a perspective view of the preferred embodiment for operation of the instant invention for communication with a second remotely located device.

FIG. 6 illustrates the preferred method of operating the device 10, comprising the device 10 and a second remotely located device 12, each device 10 and 12 being wirelessly connected to a corresponding cellular phone where said cellular phones can additionally transmit and receive signals over a wireless carrier's network. When the first user activates the device 10, the signal is sent to the corresponding cellular phone. The signal is then transmitted over the cellular phone's wireless network and is received by a second cellular phone, which then relays the signal to the second remotely located device 12. Upon detection of the signal, the second device 12 responds with any combination comprising illumination, vibration, and emission of sound. Alternatively, users may connect paired devices with other Bluetooth-enabled wireless devices, such as PDA's. In this way, long-range signals can be successfully sent when paired devices are located outside of Bluetooth range. In either embodiment, the second user is notified in real time that the first user is thinking about him or her.

While the present embodiment of the instant invention has been illustrated by way of example, it is apparent that further embodiments could be developed within the spirit and scope of the instant invention. However, it is to be expressly understood that such modifications and adaptations are within the spirit and scope of the instant invention, as set forth in the following claims.

What is claimed:

1. A method of communication comprising the steps of:
   providing a first interactive personal communication device;
   pairing said first device to a first apparatus in communication on at least one wireless network;
   providing a second interactive device;
   pairing said second interactive device to a second apparatus in communication on said at least one wireless network;
   user-programming at least one desired user-programmed response to correspond to at least one signal using at least one of said first device and said first apparatus;
   after user-programming the at least one desired user-programmed response, initiating communication between at least the first interactive device and the second interactive device by touching said first interactive device;
   in response to touching said first interactive device, transmitting the at least one signal from said first interactive device, through at least said first apparatus, through said second apparatus, and to said second interactive device; and receiving the at least one signal within said second interactive device, thereby activating the at least one desired user-programmed response within said second interactive device.

2. The method of claim 1, wherein said signal transmitted by said first interactive device and received by said second interactive device is a radio frequency signal.

3. The method of claim 1, wherein said first apparatus is a cellular telephone and said second apparatus is a cellular phone.

4. The method of claim 1, wherein said first interactive device is a piece of jewelry and said second interactive device is a piece of jewelry.

5. The method of claim 4, wherein said piece of jewelry further comprises at least one of a watch, a pendant, and a bracelet.

6. The method of claim 1, whereby upon receipt of the at least one signal, said second interactive device activates the at least one desired user-programmed response by at least one of illuminating, vibrating, and emitting an audible tone.

7. The method of claim 1, wherein said first and second interactive devices further comprise at least one light emitting diode.

8. The method of claim 1, wherein said first and second interactive devices further comprise at least one motor housed therein.

9. The method of claim 1, wherein said first and second interactive devices further comprise at least one speaker housed therein.

10. A method of communication comprising the steps of:
providing a first interactive personal communication device;
pairing said first device to a first apparatus in communication on at least one wireless network;
providing a second interactive device;
pairing said second interactive device to a second apparatus in communication on said at least one wireless network;
initiating communication between at least the first interactive device and the second interactive device by touching said first interactive device to activate transmission of the at least one signal;
filtering said signal transmission activation to prevent false signal activation; and
transmitting the at least one signal from said first interactive device, through at least said first apparatus, through said second apparatus, and to said second interactive device.

11. The method of claim 10, wherein the step of filtering said signal transmission activation to prevent false signal activation further comprises absorbing brief pulses of energy causing a false signal activation within at least one filter.

12. The method of claim 11, wherein absorbing brief pulses of energy prevents activation of at least one response within said second interactive device.

13. The method of claim 11, further comprising the step of selecting the at least one filter based on at least one of a required current and a required voltage of at least one of a light-emitting diode, a motor, and a speaker.

14. An apparatus for transmitting user-programed messages, the apparatus comprising:
a first ornamental housing containing a first interactive communication device, the first interactive device in communication with a first apparatus via at least one wireless network;
a second ornamental housing containing a second interactive communication device, the second interactive communication device in communication with a second apparatus via at least one wireless network;
a power source and least one circuit having at least one wireless communication chip within each of the first and second interactive communication devices;
a signal transmitted from said first interactive communication device, through at least said first apparatus, through said second apparatus, and to said second interactive communication device, wherein the signal is user-programmed within at least one of the first interactive communication device and the first apparatus to correspond to at least one desired user-programmed response, and wherein signal transmission is activated through physical user-contact with said first interactive communication device; and
an activated response created by the second interactive communication device, wherein the activated response corresponds to the at least one desired user-programmed response user-programmed within the first interactive communication device.

15. The apparatus for transmitting user-programed messages of claim 14, further comprising at least one antenna in communication with the at least one wireless communication chip within each of the first and second interactive communication devices.

16. The apparatus for transmitting user-programed messages of claim 14, wherein the activated response created by the second interactive communication device is at least one of an illuminated light-emitting diode, an activated motor, and an audible tone.

17. The apparatus for transmitting user-programed messages of claim 14, further comprising a filter within the second interactive communication device and positioned between the at least one wireless communication chip and at least one of a light-emitting diode, a motor, and a speaker, wherein the filter filters a signal transmission activation of the signal transmission to prevent a false signal activation.

18. The apparatus for transmitting user-programed messages of claim 17, wherein the filter absorbs brief pulses of energy causing the false signal activation.

19. The apparatus for transmitting user-programed messages of claim 14, wherein the user-programmed signal is selected to correspond to a combination of desired user-programmed responses, wherein the combination of desired user-programmed responses include at least two of illuminating a light-emitting diode, activating a motor, and activating a speaker.

20. The apparatus for transmitting user-programed messages of claim 14, wherein the signal is user-programmed within the first apparatus to correspond to the at least one desired user-programmed response, wherein the first apparatus is a mobile telephone.

* * * * *